United States Patent [19]

Tantalo

[11] 4,437,698

[45] Mar. 20, 1984

[54] FUEL SAVING DEVICE FOR INCREASING FUEL MILEAGE ON A MOVING VEHICLE

[76] Inventor: Anthony T. Tantalo, Apt. 4 43 Portland Pkwy., Rochester, N.Y. 14621

[21] Appl. No.: 406,489

[22] Filed: Aug. 9, 1982

[51] Int. Cl.³ .............................................. B62D 35/00
[52] U.S. Cl. ...................................................... 296/1 S
[58] Field of Search ............................ 296/1 S; 180/7.4

[56] References Cited

U.S. PATENT DOCUMENTS

| | | | |
|---|---|---|---|
| 1,648,505 | 11/1927 | Persu | 296/1 S |
| 2,569,983 | 10/1951 | Favre | 296/1 S |
| 3,910,623 | 10/1975 | McKeen | 296/1 S |
| 4,006,931 | 2/1977 | Groves | 296/1 S |
| 4,353,587 | 10/1982 | Brenholt | 296/1 S |

*Primary Examiner*—Robert R. Song

*Attorney, Agent, or Firm*—Samuel R. Genca

[57] ABSTRACT

A fuel saving device for increasing the fuel mileage of a moving vehicle is disclosed. The number of miles per gallon of fuel is increased by the present invention through a device mounted on top of a vehicle, which device includes a housing having a length substantially equal to the width of the vehicle, an air intake at the front of the housing and a motor driven rotor having blades which are further driven by the oncoming wind pressure created by the moving vehicle. The device also includes means for deflecting the air from the housing over the remaining portion of the vehicle and positioned in cooperative relationship with the rotor to not only reduce air friction but also to create a propulsion of air at the rear of the housing to drive the vehicle forward. A motor means drives the rotor independently of the forward speed of the moving vehicle.

10 Claims, 5 Drawing Figures

FUEL SAVING DEVICE FOR INCREASING FUEL MILEAGE ON A MOVING VEHICLE

BACKGROUND OF THE INVENTION

1. Field of the Invention

The present invention relates to a fuel saving device for increasing fuel mileage on a moving vehicle and more particularly to a device mounted on a vehicle body to effectively utilize wind pressure not only to propel the moving vehicle but also to reduce air resistance on the moving vehicle.

2. Prior Art

Many attempts have been made in the past to increase the fuel mileage of moving vehicles, particularly tractor-trailer rigs, trucks, recreational vehicles and pick-up trucks. Such prior art devices include roof mounted air deflectors for deflecting air over a trailer pulled by the tractor described in U.S. Pat. No. 4,006,931 entitled DEVICE FOR REDUCING WIND RESISTANCE ON A VEHICLE issued to Donald W. Groves. Another means for reducing air drag is shown in U.S. Pat. No. 4,102,548 entitled INFINITELY VARIABLE CONTROLLABLY AND/OR AUTOMATICALLY ADJUSTABLE AIR DEFLECTOR AND METHOD.

Other examples of reducing air resistance, air drag and air turbulence adjacent to the vehicle are more fully described in U.S. Pat. Nos. 4,022,508 (Kirsch, Day), 3,934,923 (Lissaman, Lambie).

Other prior art means for reducing oncoming air resistance and angular wind effects to a moving vehicle is shown in U.S. Pat. No. 3,910,623 (McKeen). None of the aforesaid prior art patents and no other means are known to the applicant to utilize wind pressure not only to propel the moving vehicle and at the same time reduce air resistance on a moving vehicle to thereby reduce fuel consumption, obtain fuel economy and increase the overall efficiency of the moving vehicle.

SUMMARY OF THE INVENTION

Briefly described, a fuel saving device in accordance with a preferred embodiment of the invention for increasing the fuel mileage and fuel economy of a moving vehicle, includes a cylindrical housing having a longitudinal intake opening and a diametrically opposed longitudinal exhaust opening about a longitudinal axis of the housing for the flow of air through the housing. The housing is mounted on the top of the vehicle by a frame so that the intake opening is normal to the direction of forward travel of the vehicle so that the intake opening has an open area for air intake when the vehicle is moving forward.

A rotor is coaxially mounted within the housing for rotation about a longitudinal axis. The rotor has a plurality of paddles each having a facial area at least equal to the open area of the air intake opening so that when the vehicle is moving forward the forward wind air pressure rotates the paddles in the counterclockwise direction propelling the air through an exhaust opening. The device also includes means for rotating the rotor at a rotational speed greater than the rotational speed of the rotor caused by the forward air pressure acting on the paddles when the vehicle is moving. In accordance with the invention, the open area of the air intake presents an area of low pressure while the air at the exhaust opening of the housing causes a further propulsion of air and movement of the vehicle in a forward direction.

The device is particularly useful with tractor-trailers wherein the roof of the tractor is of a height less than the height of the trailer so that when the device of the present invention is utilized, the projecting area of the trailer above the roof of the tractor is effectively reduced since an open area of reduced pressure is effected by the device. That is when the device is mounted on the roof of the tractor a reduction of the exposed area of the trailer above the roof of the tractor is decreased by the area of the intake opening and forward air pressure acting on the moving vehicle is directed away from the trailer. The effect is that the present invention reduces frontal area of the tractor-trailer coupled with air propulsion to urge the vehicle forward and deflect air away and above the tractor-trailer.

BRIEF DESCRIPTION OF THE DRAWINGS

The invention will be better understood upon consideration of the following detailed description taken together with the accompanying drawings in which are like elements in various figures having like designations and in which.

DESCRIPTION OF THE PREFERRED EMBODIMENT

Figure 1:
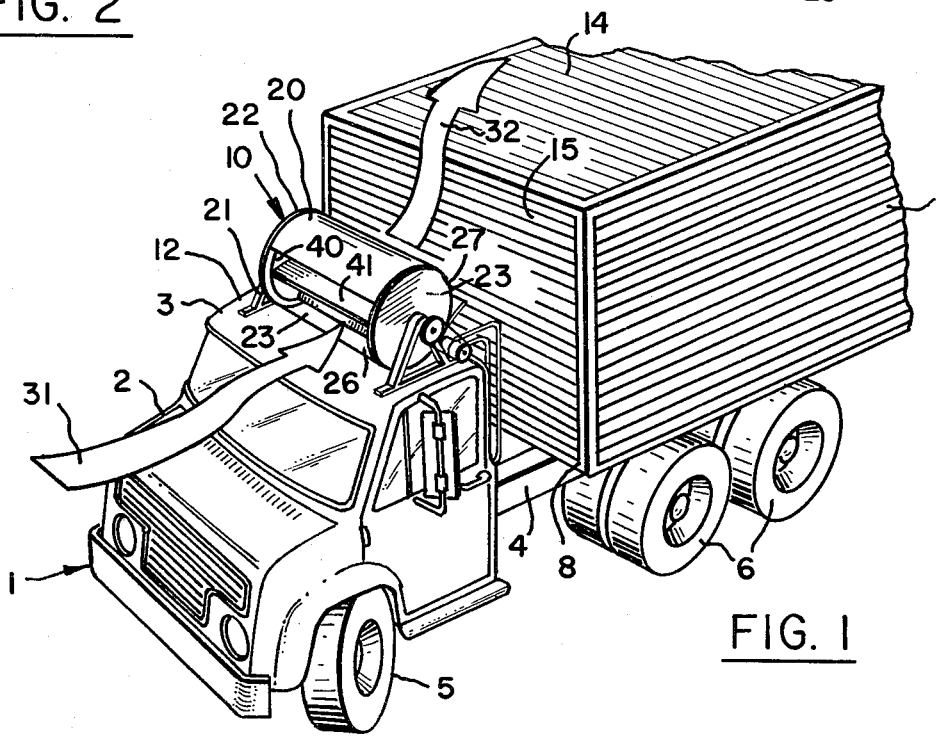
FIG. 1 is a perspective view of a fuel saving device in accordance with a preferred embodiment of the invention mounted on a tractor-trailer vehicle which is shown in fragmentary perspective view.

The fuel saving device of the present invention will be described with particular reference to the preferred embodiment illustrated in the drawing. It should be understood that the drawing illustrations and description are to be taken only as illustrative of the preferred embodiment of the device of the present invention and is to be understood in a general way and not in a restrictive way. FIG. 1 shows a tractor-trailer vehicle 1 having a fuel saving device 10 in accordance with the invention for increasing the fuel to mileage ratio of the vehicle 1. The vehicle 1 of FIG. 1 includes a tractor 2 having a cab body 3 supported on a frame 4. The frame 4 is supported by front steerable wheels 5 and rear driving wheels 6. The vehicle 1 also includes a semi-trailer 7 having a forward trailer portion 8 pivotally coupled to the frame 4 of the tractor 2 by means of a fifth wheel coupling 9.

The cab body 3 has a generally flat roof 12 which is lower in height than the top 14 of the semi-trailer 7. The forward trailer portion 8 thus has an upper forward portion 15 exposed about the cab body 3.

Referring now to FIGS. 1 through 5, the fuel saving device 10 includes a housing 20 and a housing frame 21 for mounting the device 10 on the roof 12 of the cab body 3. The housing 20 includes stationary side plates 22 and 23 fixed to cylindrical cover plate 24 having intake opening 25 on the forward side 26 of the housing 20 and an exhaust opening 27 on the rearward side 28 of the housing 20. The intake of air into the device 10 and housing 20 is graphically shown by the large arrow 31 while the exhausting and explusion of the same air from the device 10 and housing 20 is graphically shown by the large arrow 32. The exhausting air shown by the arrow 32 is metered through the exhaust opening 27 by a controlled pivotally mounted exhaust baffle 33. The exhaust baffle 33 is pivotally mounted to the cylindrical cover plate 24 at 34 and is under the control of a hydraulic cylinder 35 and elevation control means 36 which may be mounted within the cab body 3. The main function of the exhaust baffle 33 is to direct the exhausting air from the housing 20 over the trailer 7.

The fuel saving device 10 includes a motor driven rotor 40 having a plurality of paddles 41, 42, 43, 44, 45. While only five paddles are shown, it should be understood that more than five paddles 41, 42, 43, 44, 45 may be utilized without departing from the invention. The paddles 41, 42, 43, 44, 45 are fixed between rotor side plates 46 and 47 of the rotor 40 about a longitudinal axis 50 of the housing 20 on an axle 51. Coupled to the axle 51 is a rotor drive means 60 for rotating the rotor 40 independently of an external force acting on the paddles 41, 42, 43, 44, 45 such as wind pressure shown by the aforesaid large arrow 31. The rotor drive means 60 includes a pulley 61 connected to the axle 51, a hydraulic motor 62 having a pulley 63 coupled to the pulley 61 by a belt 64. The hydraulic motor 62 is connected to a hydraulic pump 65 through a motor control unit 66. The motor control unit 66 may be mounted in the cab 3 to control the hydraulic motor 62 when the vehicle 1 is at rest or moving. It is desirable when the vehicle 1 is at rest that the hydraulic motor 62 does not rotate the rotor 40. The motor control unit 66 may also control the speed of rotation of the rotor 40 if desired.

The opening 25 of the housing 20 has an area substantially equal to the area of the paddles 41, 42, 43, 44, 45, thus each paddle 41, 42, 43, 44, 45 responds to a wind pressure disposed over the area of the paddles 41, 42, 43, 44, 45 and thereby urges the rotor 40 to rotate in response to the forward movement of the vehicle 1. Rotation of the rotor 40 is also effected by the motor drive means 60.

The frame 21 is mounted on the roof 12 of the cab 3 by adjustable pads 70 and spacers 71 so that the height of the device 10 relative to the height of the semi-trailer 7 may be adjusted for the flow of the exhausting air 32 over the semi-trailer 7. It is desirable to have the exhausting air 32 be directed above the forward portion 15 and above the trailer 7.

Figure 2:
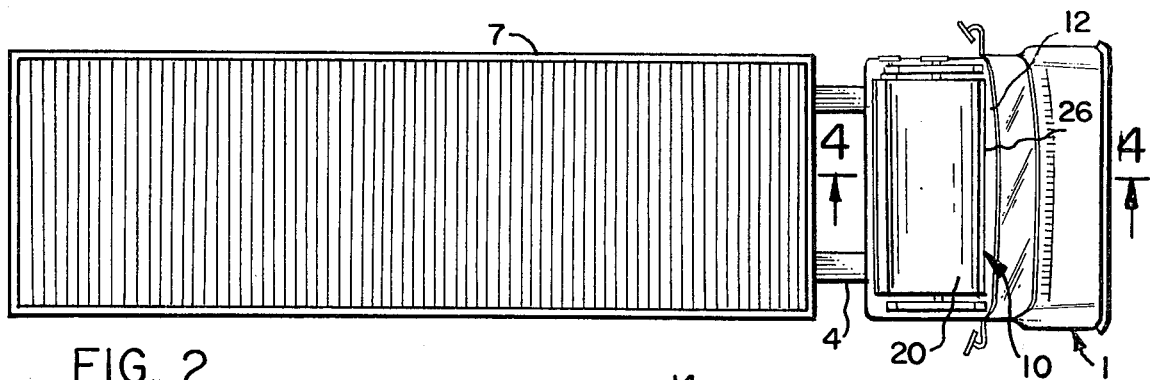
FIG. 2 is a top view of the tractor-trailer including the fuel saving device in accordance with the invention for increasing the fuel mileage of the vehicle.
Figure 3:
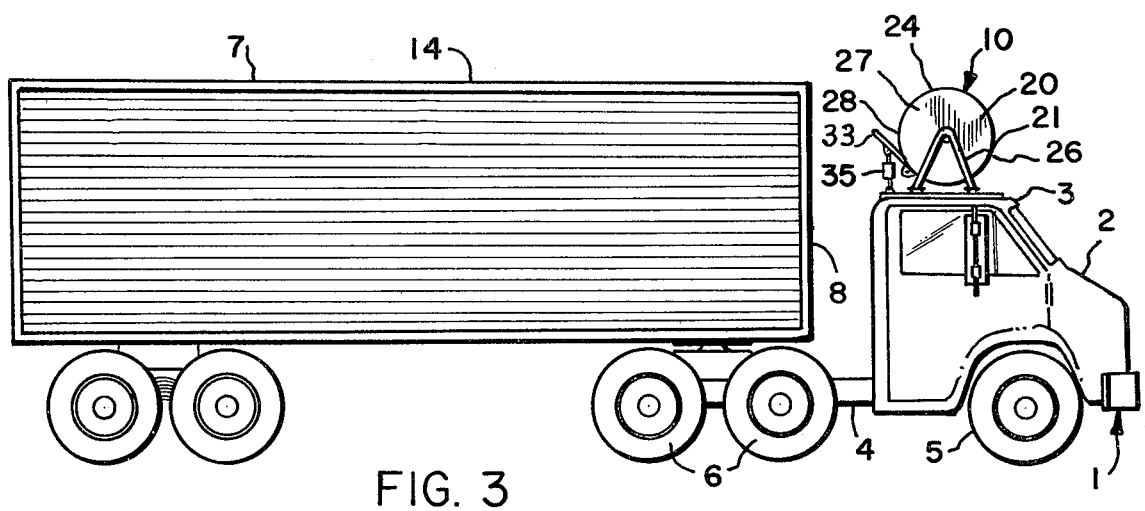
FIG. 3 is a side elevation view of the tractor-trailer vehicle of FIGS. 1 and 2 showing a side view of the fuel saving device.
Figure 4:
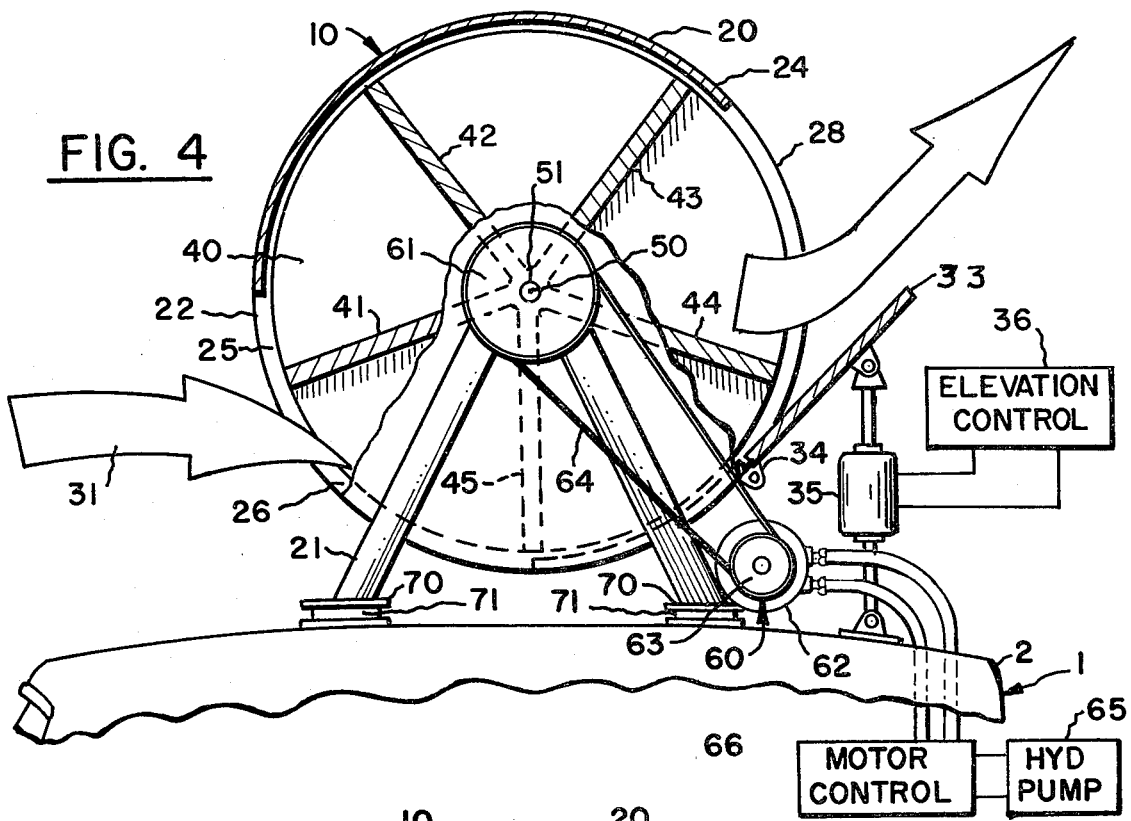
FIG. 4 is a cross-sectional view of the fuel saving device taken along lines 4—4 of FIG. 2.
Figure 5:
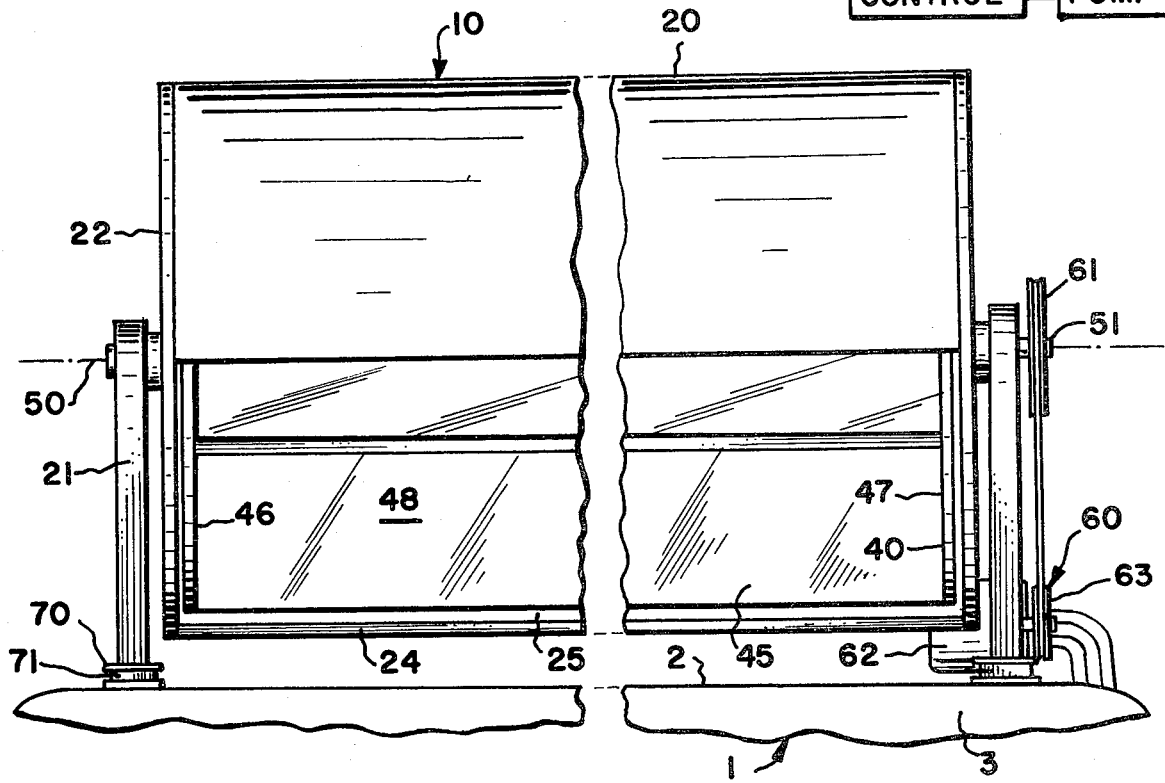
FIG. 5 is a front view of the fuel saving device shown in FIG. 1.

Referring to FIGS. 1–3, the housing 20 has a longitudinal length measured along the longitudinal axis 50 substantially equal to the width of the vehicle 1. As will be more fully explained in the operation of the vehicle 1, the moving vehicle 1 experiences a wind resistance which is translated in a wind pressure against the vehicle 1 when it is moving forward. This wind pressure is shown by arrow 31. Thus, since the wind pressure (arrow 31) acts on the vehicle 1 and the paddles 41, 42, 43, 44, 45 through opening 25, it is desirable to have the housing 20 substantially equal in length to the width of the vehicle 1 to utilize the full wind pressure (arrow 31). The device 10, as will be seen, creates a low pressure at the opening 25 and thereby further assists in moving the vehicle 1 forward.

When the device 10 is utilized with vehicle 1, it is desirable to have the device 10 mounted on the roof 12 of the cab 3 so that the cylindrical cover 24 of the housing 20 is in front of the forward portion 15 of the trailer 7 and below the top 14 of the trailer 7. The frame pads 70 and spacers 71 are used for the purpose of mounting the device 10 as stated above.

The aforesaid wind pressure (shown by arrow 31) acts through the intake opening 25 and against each of the paddles 41, 42, 43, 44, 45 sequentially as the rotor 40 is rotated. Each paddle 41, 42, 43, 44, 45 has a facial area 48 at least equal to the area of the intake opening 25 to utilize as much as the wind pressure (arrow 31) as possible to rotate the rotor 40.

OPERATION

The fuel saving device 10 is effective when the vehicle 1 is moving in a forward direction. When the vehicle 1 is moving in a forward direction, the vehicle 1 experiences an air drag or wind resistance which is translated into a wind or dynamic pressure shown by the large arrow 31. The wind or dynamic pressure caused by the moving vehicle 1 rotates the rotor 40 about the axis 50 on axle 51 when the wind pressure acts on the paddles 41, 42, 43, 44, 45 through the intake opening 25 of the housing 20. The rotational speed of the rotor 40 is a function of the linear speed of the vehicle 1 and a head wind, if present. The greater the linear speed of the vehicle 1, the greater the rotational speed of the rotor 40. The rotor 40 is also rotated by the hydraulic motor 61 of the rotor drive means 60. Since the rotor 40 is primarily rotated by the wind pressure acting on the paddles 41, 42, 43, 44, 45, very little additional power is required of the rotor drive means 60 to rotate the rotor 40. When the rotor 40 is rotated by the combined action of the wind pressure and rotor drive means 60, the wind pressure at the intake opening 25 of the housing 20 is effectively lowered by the suction action of the rotor 40 and therefore the vehicle 1 is urged in a forward direction, thus increasing fuel mileage at a first stage. The rotor 40, when rotating, propels air through the housing 20 and through the exhaust opening 27 to further assist the forward moving vehicle 1 in a forward direction.

The exhausting air from the housing 20 is directed into upward and rearward directions as indicated by the large arrow 32. The exhaust baffle 33 may be adjusted through the elevation control 36 to obtain the most desirable deflection of the air flow as shown by arrow 32 from the housing 20 over the trailer 7. The exhaust baffle 33 also functions to minimize eddy currents (not shown) between the cab body 3 and trailer 7. The exhaust baffle 33 also directs the air flow (arrow 32) above the trailer 7 and counteracts against the oncoming air flow above the cab body 3 and housing 20. It may be seen that the exhaust baffle 33 directs the air flow (arrow 32) upward above the trailer 7 to reduce the velocity of the air flow which normally would flow across the top 14 of the trailer 7. Without the fuel saving device 1, the upper forward portion 15 of the trailer 7 sustains substantial wind resistance adversely affecting the fuel economy of the vehicle 1. With the present invention, the device 10 channels the oncoming air flow as shown by arrow 31 with a minimum turbulence above the upper forward portion 15 and the top 14 of the trailer 7. As may now be seen, the fuel saving device increases the miles per gallon of fuel used in the vehicle 1 when moving in a forward direction by creating a reduction in forward air resistance while obtaining forward thrust by the expulsion of the oncoming air over the top 14 of the trailer 7.

The invention is also useful as a dynamic air brake for the vehicle 1 since the hydraulic motor 62 which normally drives the rotor 40 in a counterclockwise direction to draw in air when the vehicle 1 is moving in a forward direction may also drive the rotor 40 in a clockwise direction to expel air. That is, the rotor 40 may be driven in the opposite direction to act against the oncoming air flow shown by large arrow 31, thus having an air braking characteristic which is particularly useful in decreasing the speed of the vehicle 1. The air braking feature of the device 10 is particularly desirable when the vehicle 1 is moving downhill and the regular brakes of the vehicle 1 must be used to slow the vehicle 1.

The fuel saving device of the present invention is shown in association with the cab body 3 of a tractor-trailer vehicle 1 as an example of a preferred form of the invention. The invention is equally adaptable to the cab of a truck having a fixed truck body, an automobile or truck used to pull a travel trailer or mobile home, as well as other trucks such as a pickup truck.

Modifications and alterations may occur to those skilled in the art, for example the housing 20 may be shaped as a rigid airfoil or a deflector having a leading edge at intake opening 25 of the housing 20.

Having thus described the invention, it will be evident that other modifications and improvements may be made by one skilled in the art which would come within the scope of the annexed claims.

What is claimed as new and desired to be secured by Letters Patent of the United States is:

1. a fuel saving device for increasing fuel mileage on a moving vehicle comprising:
   (a) a housing mounted on top of said moving vehicle,
      (i) said housing having an air intake opening at the front of said housing and an exhaust opening at the rear of said housing for the flow of air therethrough,
   (b) a motor driven rotor disposed within said housing and positioned in cooperative relationship with said air intake opening and exhaust opening of said housing so that said rotor rotates at various rotational speeds in response to a forward wind pressure generated when said vehicle is moving in a forward direction, and
   (c) rotor drive means for rotating said rotor at a greater speed than said various rotational speeds to decrease said forward wind pressure at said intake opening of said housing.

2. The invention defined in claim 1 wherein said rotor includes a plurality of paddles, each of said paddles being responsive to said forward wind pressure for rotating said rotor in a given direction.

3. The invention defined in claim 1 further including deflector means connected to said exhaust opening of said housing for deflecting said flow of air from said housing away from said vehicle.

4. The invention defined in claim 1 futher including a controllable exhaust baffle pivotally mounted on said housing for controlling the flow of said air from said exhaust opening of said housing.

5. A device for obtaining fuel economy on a moving vehicle comprising:
   (a) a cylindrical housing having an air intake opening and an exhaust opening for the flow of air through said housing,
      (i) said air intake opening and said exhaust opening being diametrically opposed on said housing about a longitudinal axis of said housing,
   (b) frame means for mounting said housing on said vehicle with said air intake opening disposed in the direction of forward travel of said vehicle for said flow of air through said housing,
   (c) a rotor coaxially mounted in said housing for rotation about said longitudinal axis,
      (i) said rotor being positioned in cooperative relationship to said intake opening of said housing to rotate in response to said flow of air through said housing, and
   (d) means connected to said rotor for rotating said rotor at a rotational speed greater than the rotational speed of said rotor caused by said flow of air through said housing.

6. The invention defined in claim 5 further including a baffle means connected to said housing for deflecting said flow of air through said housing and from said exhaust opening above said vehicle.

7. The invention defined in claim 6 wherein said baffle means includes a baffle plate connected to said housing to deflect from said exhaust opening of said housing said flow of air through said housing.

8. A device for obtaining fuel economy on a moving vehicle comprising:
   (a) a cylindrical housing having an air intake opening and an exhaust opening for the flow of air through said housing,
      (i) said air intake opening and said exhaust opening being diametrically opposed on said housing about a longitudinal axis of said housing,
   (b) frame means for mounting said housing on said vehicle with said air intake opening disposed in the direction of forward travel of said vehicle for said flow of air through said housing,
   (c) a rotor coaxially mounted in said housing for rotation about said longitudinal axis,
      (i) said rotor being positioned in cooperative relationship to said intake opening of said housing to rotate in response to said flow of air through said housing,
   (d) rotor drive means connected said rotor for rotating said rotor at a rotational speed greater than the rotational speed of said rotor caused by said flow of air through said housing, and
   (e) rotor drive control means connected to said rotor drive means for selectively rotating said rotor and for selectively reversing said direction of rotation of said rotor to reverse said flow of air through said housing.

9. The invention defined in claim 8 further including a baffle plate pivotally mounted on said housing proximal to said exhaust opening for deflecting said flow of air through said exhaust opening.

10. The invention defined in claim 9 further including baffle control means for selectively controlling the angular position of said baffle plate relative to said exhaust opening of said housing.

* * * * *